F. B. DAVIDSON.
CONTAINER.
APPLICATION FILED MAR. 18, 1912.
1,028,195.
Patented June 4, 1912.
2 SHEETS—SHEET 1.
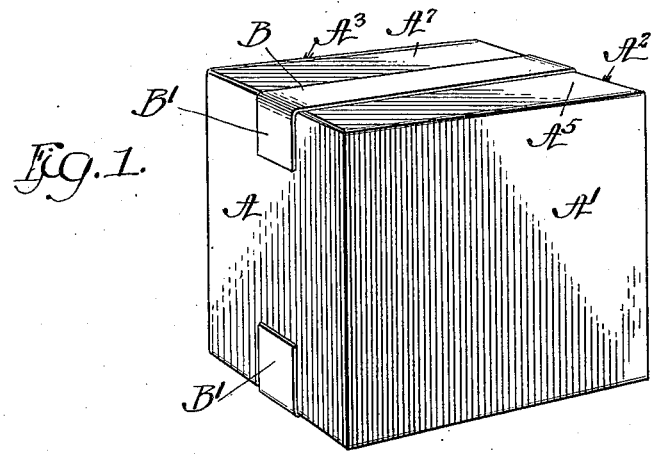
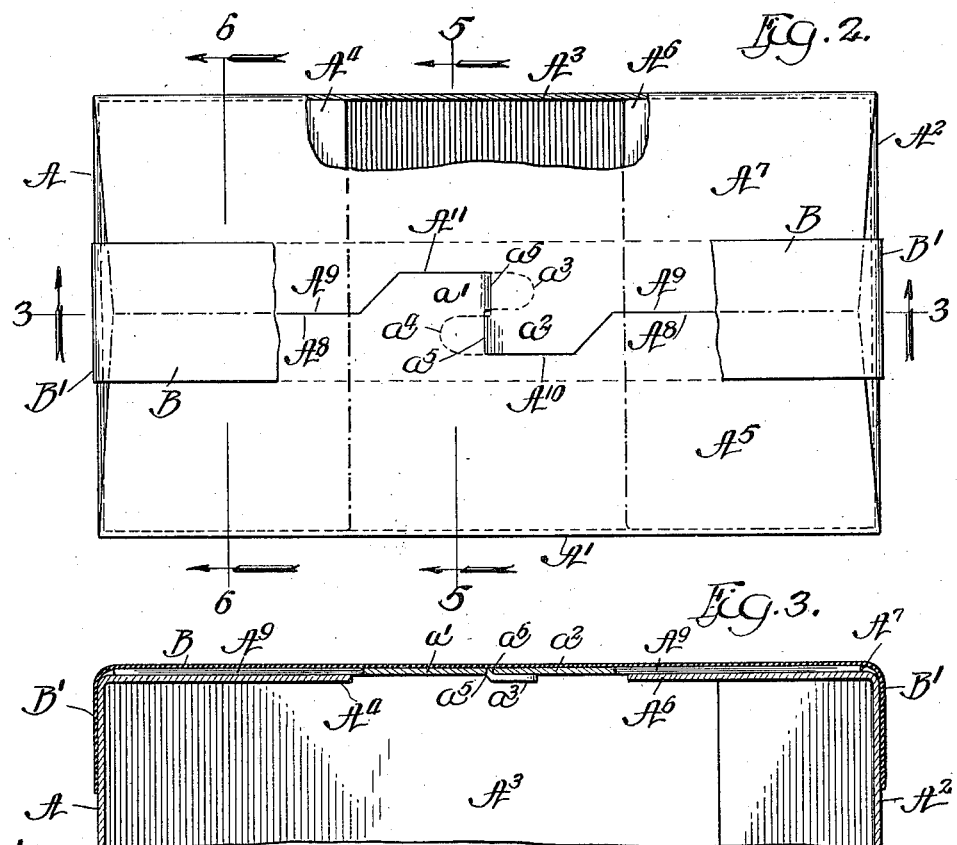
Witnesses:
Inventor
Frank B. Davidson
by C. Clarence Poole Atty

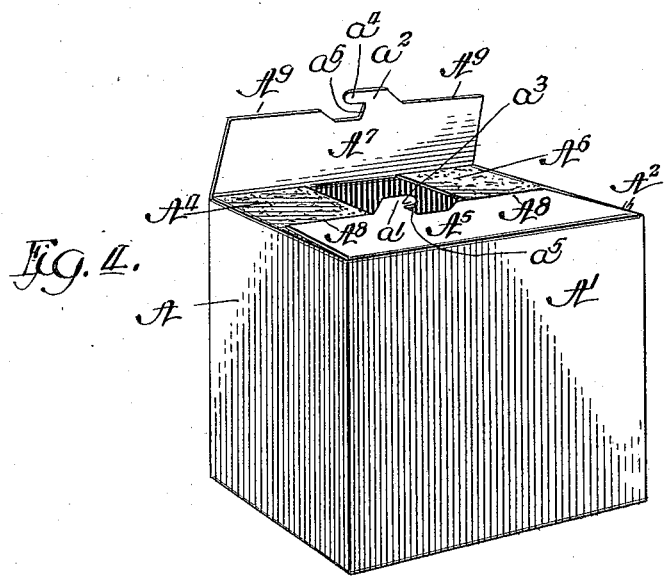
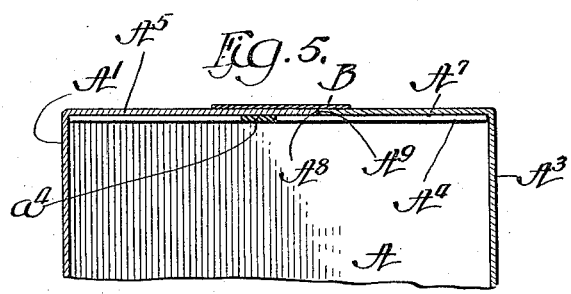
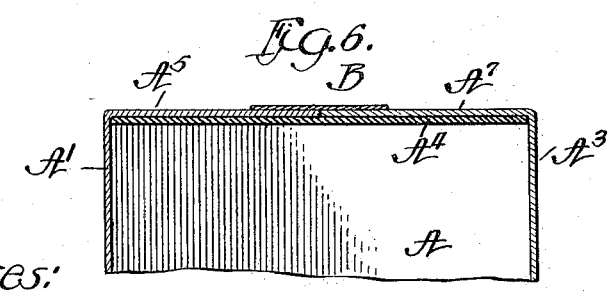

UNITED STATES PATENT OFFICE.

FRANK B. DAVIDSON, OF MARSEILLES, ILLINOIS, ASSIGNOR TO HOWE AND DAVIDSON COMPANY, OF EAST ORANGE, NEW JERSEY, A CORPORATION OF NEW JERSEY.

CONTAINER.

1,028,195.   Specification of Letters Patent.   Patented June 4, 1912.

Application filed March 18, 1912. Serial No. 684,397.

*To all whom it may concern:*

Be it known that I, FRANK B. DAVIDSON, a citizen of the United States, and a resident of Marseilles, in the county of Lasalle and State of Illinois, have invented certain new and useful Improvements in Containers; and I do hereby declare that the following is a full, clear, and exact description thereof, reference being had to the accompanying drawings, and to the letters of reference marked thereon, which form a part of this specification.

This invention relates to a novel box or container made from heavy paper-board, straw-board, or like material and designed more especially to be used in place of a wooden packing box for containing articles of merchandise in the form of separate packages, such as filled cartons or the like.

The present invention constitutes an improvement in the similar container shown in my prior Patent No. 958,372, granted May 17, 1910.

The invention consists of the matters hereinafter set forth and more particularly pointed out in the appended claim.

In the drawings accompanying the specification—Figure 1 represents a perspective view of the improved container when it is set up and finally closed and sealed at its top and bottom; Fig. 2 is a top plan view of the container with portions broken away to show the details of construction; Fig. 3 is a detail, longitudinal section, taken through the top wall of the container on the line 3—3 of Fig. 2; Fig. 4 is a perspective view of the box without the sealing strips and with one of the outer flaps of the top or end in open position; Fig. 5 is a transverse, detail section taken on line 5—5 of Fig. 2; Fig. 6 is a similar section taken on the line 6—6 of Fig. 2.

The body of the box or container embodying my invention is of tubular form and is preferably made from an elongated single piece or blank which is bent into the form of a tube and the ends of which are secured to each other by paste, glue or other fastening means.

The tubular body of the box is shown as consisting of four connected side walls A, $A'$, $A^2$, $A^3$, provided at their ends with flaps $A^4$, $A^5$, $A^6$, $A^7$, which are folded together to constitute end walls (Fig. 4), by which the ends of the tube are closed. Said flaps are of the same width as the side walls on which they are formed. The two opposite flaps $A^4$, $A^6$, on the side walls A, $A^2$, constitute the inner flaps of one of the end walls, and the flaps $A^5$, $A^7$ on the side walls $A'$, $A^3$, the outer flaps of said end wall. When the several flaps are folded inwardly to form the end wall of the box, the flaps $A^4$, $A^6$, are folded inside the flaps $A^5$, $A^7$ and in the same plane with each other.

The outer flaps $A^5$, $A^7$ are both made of the same length, except at their central parts; having straight end margins $A^8$, $A^9$, which meet each other along the center line of the end wall. At the central part of their end margins, said flaps $A^5$, $A^7$ are provided with extensions $a'$, $a^2$ provided with laterally extending and oppositely disposed locking tongues $a^3$, $a^4$. Each of the flaps is cut away to form a notch which extends inwardly from the line of the edges $A^8$, $A^8$ or $A^9$, $A^9$ to receive the extension $a'$ or $a^2$ of the opposite flap, the laterally extending margins $A^{10}$, $A^{11}$ of said notches being offset inwardly from said margins $A^8$, $A^9$. Locking notches $a^5$, $a^6$ are formed between said tongues $a^3$, $a^4$ and the adjacent edges $A^{10}$, $A^{11}$ of the flaps. The outer edges $A^8$, $A^{10}$, of the flap $A^5$ abut against the other corresponding edges $A^9$, $A^{11}$ of the flap $A^7$, and the tongues $a^3$, $a^4$ engage, respectively, within the notches $a^5$, $a^6$ formed by said tongues, so as to lock said flaps from spreading apart, said tongues when in interlocked position, extending underneath the flap extensions $a'$, $a^2$, as plainly indicated in Fig. 3. By this construction in the flaps and locking means, the parts constituting the end wall have their outer surfaces in the same plane. The inner surfaces of said flaps also lie in substantially the same plane, so that the flaps $A^4$ and $A^6$ have close contact with said flaps $A^5$ and $A^7$. (See Figs. 3 and 6.) Said flaps $A^4$ and $A^6$ are preferably terminated short of the middle line of the box so as to form a space in which the internally disposed tongues $a^3$, $a^4$ are located, the inner faces of said tongues being in the same plane with the inner faces of the flaps $A^4$, $A^6$, as clearly seen in Fig. 2.

To seal the flaps after folding them inward, and interlocking them, as described, to close the end of the box, a sealing or closing strip B of flexible material, such as tough paper, is secured by an adhesive substance to the outside surfaces of the outer flaps. Such sealing strip is applied with its center line over the meeting edges $A^8$, $A^9$ of the outer flaps, and has its ends extended over the side walls of the box, as indicated at B', B'. The container shown in my prior patent referred to is provided with a like sealing strip, but by reason of the offset relation of the meeting edges of the outer flaps, at the opposite ends of such meeting edges, the sealing strip applied to the outer flaps, as shown in said patent, at each side of its longitudinal center, is secured mainly to one flap and overlaps to a slight extent only the other flap. The sealing flap so applied is liable to be insecurely attached to one of the flaps, and if carelessly applied, does not act to efficiently hold the flap in place and seal the joint between them. In the present construction, the sealing strip has an equal part of its width secured to both outer flaps, so as to strongly and reliably retain in place the meeting edges of said flaps, throughout the principal part of the length of said meeting edges. At the central parts of the said meeting edges they are secured together and held in proper relative position by the interlocking tongues and notches, so that the adhesion of the sealing strip to the marginal parts of the flaps, at such central part, need not be relied upon for this purpose.

If desired, adhesive material may be applied between the meeting faces of the inner and outer flaps, and in that case, the sealing strip will not be alone relied upon to hold in place the meeting edges of the outer flaps, but whether the inner and outer flaps are so additionally held in place by adhesive material or not, the construction described insures that the sealing strip will be firmly and strongly attached to both of the outer flaps, and that the joint between said outer flaps will be efficiently and securely covered or sealed.

A carton embodying the features of construction set forth may be variously modified in its details of construction, and I do not desire to be limited to the specific construction illustrated, except as pointed out in the appended claim.

I claim as my invention—

A box of sheet material having connected side walls and an end wall, said end wall consisting of two opposite inner flaps folded inwardly, and two opposite outer flaps folded inwardly against said inner flaps, the end margins of said outer flaps being adapted to meet each other in a straight line, except at their central parts, and being provided at such central parts with oppositely disposed extensions and corresponding notches and in the adjacent ends of said extensions with laterally disposed locking tongues separated from the edges of the flaps by locking notches; the locking tongues on each flap being adapted to enter beneath the extension of the other flap when the flaps are interlocked, and a strip of flexible material adhesively secured to the outer flaps with its center over the meeting edges of the same and its side margins overlapping to an equal extent both of said outer flaps.

In testimony, that I, claim the foregoing as my invention I affix my signature in the presence of two witnesses, this 12th day of March A. D. 1912.

FRANK B. DAVIDSON.

Witnesses:
 W. B. DAVIDSON,
 A. L. POOLE.